(12) United States Patent
Karvounis et al.

(10) Patent No.: US 10,401,168 B2
(45) Date of Patent: Sep. 3, 2019

(54) METHODS RESOLVING THE ELEVATION OF A TRACKED PERSONNEL OR ASSETS

(71) Applicant: TRX SYSTEMS, INC., Greenbelt, MD (US)

(72) Inventors: John Karvounis, Bowie, MD (US); Jared Napora, Severn, MD (US); Benjamin E. Funk, Hanover, MD (US); Dan Hakim, Silver Spring, MD (US); Christopher Giles, Elkton, MD (US); Carole Teolis, Glenn Dale, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 100 days.

(21) Appl. No.: 15/591,946

(22) Filed: May 10, 2017

(65) Prior Publication Data

US 2017/0328718 A1 Nov. 16, 2017

Related U.S. Application Data

(63) Continuation of application No. 13/916,024, filed on Jun. 12, 2013, now Pat. No. 9,671,224.

(60) Provisional application No. 61/783,799, filed on Mar. 14, 2013, provisional application No. 61/658,883, filed on Jun. 12, 2012.

(51) Int. Cl.
*G01C 5/06* (2006.01)
*G01C 5/00* (2006.01)
*G01C 21/20* (2006.01)

(52) U.S. Cl.
CPC ............... *G01C 5/06* (2013.01); *G01C 5/00* (2013.01); *G01C 21/206* (2013.01)

(58) Field of Classification Search
CPC .......... G01C 5/06; G01C 21/206; G01C 5/00
See application file for complete search history.

(56) References Cited

U.S. PATENT DOCUMENTS

| | | | |
|---|---|---|---|
| 4,457,179 A | 7/1984 | Antonazzi et al. |
| 6,125,710 A | 10/2000 | Sharp |
| 7,751,949 B2 | 7/2010 | Alanen |
| 8,706,414 B2 | 4/2014 | Funk et al. |
| 8,874,398 B2 | 10/2014 | Raghupathy et al. |
| 9,146,113 B1 | 9/2015 | Funk et al. |

(Continued)

FOREIGN PATENT DOCUMENTS

JP 2011-257260 A 12/2011

OTHER PUBLICATIONS

English translation of JP 2011-257260, published on Dec. 2011.

(Continued)

*Primary Examiner* — Huan H Tran
(74) *Attorney, Agent, or Firm* — BakerHostetler

(57) ABSTRACT

Methods and systems are described for determining the elevation of tracked personnel or assets (trackees) that can take input from mounted sensors on each trackee (including barometric, inertial, magnetometer, radio frequency ranging and signal strength, light and GPS sensors), external constraints (including ranging constraints, feature constraints, and user corrections), and terrain elevation data. An example implementation of this method for determining elevation of persons on foot is described. But this method is not limited to computing elevation of personnel or to on foot movements.

39 Claims, 10 Drawing Sheets

(56) References Cited

U.S. PATENT DOCUMENTS

| | | | |
|---|---|---|---|
| 9,322,648 B1 | 4/2016 | Karvounis et al. | |
| 9,664,521 B2* | 5/2017 | Funk et al. | |
| 9,671,224 B2* | 6/2017 | Karvounis | G01C 5/00 |
| 9,733,091 B2 | 8/2017 | Kordari et al. | |
| 10,012,502 B2* | 7/2018 | Karvounis | G01C 5/00 |
| 2008/0077326 A1 | 3/2008 | Funk et al. | |
| 2010/0250134 A1 | 9/2010 | Bornstein et al. | |
| 2010/0299065 A1* | 11/2010 | Mays | G01C 21/20 |
| | | | 701/533 |
| 2011/0153208 A1 | 6/2011 | Kruglick | |
| 2012/0072110 A1 | 3/2012 | Venkatraman | |
| 2012/0290253 A1 | 11/2012 | Barrett et al. | |
| 2014/0135040 A1 | 5/2014 | Edge et al. | |
| 2016/0169670 A1 | 6/2016 | Karvounis et al. | |

OTHER PUBLICATIONS

U.S. Appl. No. 61/783,799, filed Mar. 14, 2013, Kavounis et al.
International Patent Application No. PCT/US2013/45446; Int'l Preliminary Report on Patentability; dated Jan. 29, 2015; 29 pages.

\* cited by examiner

METHODS RESOLVING THE ELEVATION OF A TRACKED PERSONNEL OR ASSETS

CROSS REFERENCE TO RELATED APPLICATIONS

This application is a continuation of U.S. patent application Ser. No. 13/916,024, filed Jun. 12, 2013, which claims benefit under 35 U.S.C. § 119(e) of Provisional U.S. Patent Application No. 61/783,799, filed Mar. 14, 2013, and Provisional U.S. Patent Application No. 61/658,883, filed Jun. 12, 2012, the contents of which are incorporated herein by reference in their entireties.

GOVERNMENT RIGHTS

This invention was made with Government support under W91CRB-09-00089, awarded by the U.S. Army; and W31P4Q-10-C-0166, awarded by the Defense Advanced Research Projects Agency. The Government has certain rights in the invention.

TECHNICAL FIELD

The present disclosure relates to systems and methods for tracking personnel or assets without the benefit of GPS sensors.

BACKGROUND

The present disclosure relates to algorithms and technology for effective, accurate location, and tracking solutions in GPS denied environments. Tracking systems for personnel or assets use a set of inertial, magnetometer, pressure, and ranging sensors to provide location estimates (and map buildings) when moving in GPS-denied environments.

SUMMARY

A method has been developed and implemented to resolve the elevation of tracked personnel or assets (trackees) that can take input from mounted sensors on each trackee (including barometric, inertial, magnetometer, radio frequency ranging and signal strength, light and GPS sensors), external constraints (including ranging constraints, feature constraints, and user corrections), and terrain elevation data. An implementation of this method has been completed for determining elevation of persons on foot but this method is not limited to computing elevation of personnel.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
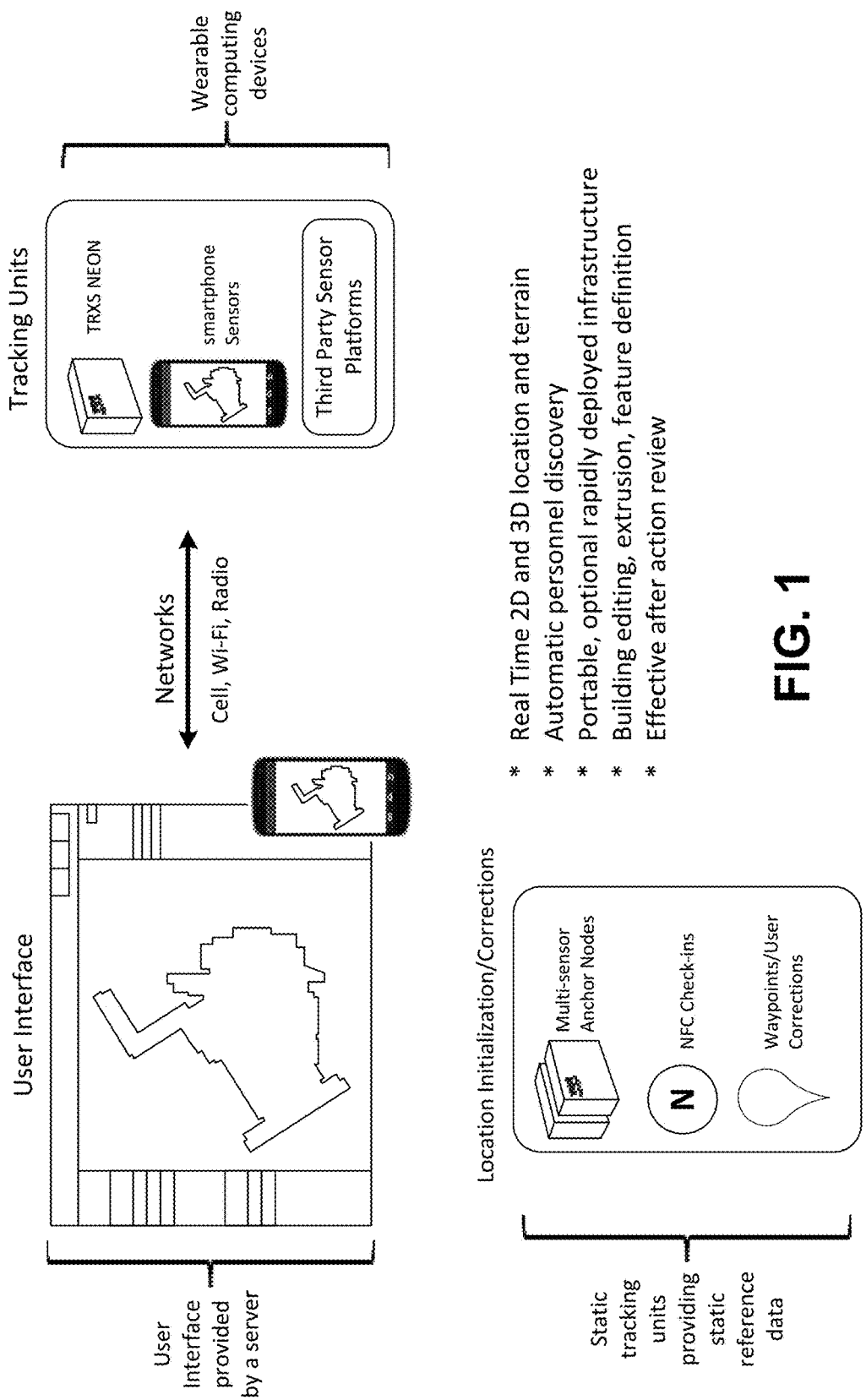
FIG. 1 illustrates an example of a tracking system in a GPS denied environment, according to an embodiment of the present disclosure.

Wearable computing systems configured for tracking (e.g., waist worn tracking systems, such as illustrated in FIG. 1) may use a set of inertial, magnetometer, pressure, and ranging sensors to provide location estimates (and map buildings) for personnel moving in GPS-denied environments (or other environments that are denied data from satellite positioning or navigation systems, e.g., Galileo). One possible implementation of the elevation method uses a computing device associated with a user and a server. The user may be referred to as trackee and may be a personnel for which an elevation is determined; the computing device associated with the user may be referred as a trackee device. The elevation and other location data of the trackee may correspond to the elevation and other location data of the trackee device. The computing device may collect and transmit data to the server that, in turn, processes the data to generate an elevation. In an embodiment, the elevation method takes input data received from the computing device, such as TRX Systems Tracking Unit (e.g., a dynamic trackee device provided by TRX Systems), and another computing device, such as Multi-Sensor Anchor Nodes (e.g., a static device providing reference data). This data along with location constraints entered in the Neon Command Station or Neon Handheld User Interface software, both of which may be hosted on the server and may be provided by TRX Systems, provide the necessary information to accurately resolve a trackee's elevation. Once an absolute altitude is able to be determined, the server, such as the Neon Elevation Engine (which may be provided by TRX Systems), uses the user entered building and terrain information to further determine the relative elevation from the terrain as well as floor numbers suitable for display in the Neon Command Station software.

In the NEON system (e.g., a system provided by TRX Systems that comprise all or some of the elements described herein), 3-D location estimation may be computed in 2 phases, first a 2-D location estimate is made providing a globally referenced location (longitude and latitude) and then an elevation estimate is computed. These two segments of the processing may be independent; one can occur without the other. This disclosure focuses only on the computation of globally referenced elevation (e.g., the second phase of the 3-D location estimation). This elevation engine could be combined with any mechanism for estimating 2-D location.

Input Data

This method computes elevation for either static (a stationary reference anchor) or dynamic (a movable tracked asset or individual) trackees. It also provides adjustments to floor heights in building models. Several input data sources are considered when resolving the altitude of a trackee. These data sources are detailed in Table 1.

TABLE 1

Neon Elevation Engine Input Data

| Input Data | Source | Data Rate (Hz) |
|---|---|---|
| Chirp Spread-Spectrum Ranging | TRX Tracking Unit/ TRX Anchor | Variable |
| Waypoint Check-in | Android Phone | Variable |
| User Correction | Command Station/Android Phone | Variable |
| Barometric Pressure Sensor | TRX Tracking Unit/TRX Anchor | Variable |
| Terrain Elevation Data | USGS | (min 0.33 Hz) |
| Building Models | NEON Command Station (or other) | |

In an embodiment, the method may collect ranging data from a Chirp Spread Spectrum RF ranging model. But the method is not limited to this data source. Instead, this data source is intended to represent data from any ranging source that can provide range to a known reference location/feature (for example, this could also come from an optical sensor). The Waypoint Check-in and User Correction represent any manual source of providing location/elevation data. The barometric pressure sensor represents any source of elevation data, for example, a laser altimeter in an air vehicle. Terrain elevation data can be obtained from many sources at varying resolutions. Building models provide floor footprint data and some estimate of floor spacing. The floor spacing is adaptively updated by the algorithm.

Elevation Engine Cortices

The Neon Elevation Engine (e.g., implemented on a server) may be arranged into individual components (cortices) that can be executed in series. A cortex is a small modular function block of code that can have almost any task. For example, the cortex can be responsible for calculating the properties of given data sets, filtering, or applying constraints. Each cortex can run in parallel with others or in series. The structure imposed on implementation of cortices allows them to be used as algorithm building blocks.

The first cortex, Create Elevation Ranges Cortex, can be responsible for extracting all data that can constrain a trackee's elevation within some error bounds. Then the elevation global and local solvers, both of which may be implemented using Elevation Global Solver Cortex and Elevation Local Solver Cortex, respectively, can use the filtered constraints along with additional raw sensor data to further resolve the absolute elevation of the trackee.

Create Elevation Ranges Cortex

The create elevation ranges cortex can serve two primary functions. It can first identify static (non-moving) trackees with associated sensor data. The static trackees could be Multi-sensor Anchor Nodes, Waypoints, or NFC Check-in locations (as shown in FIG. 1) that are placed in the environment. Secondly, it can extract the distances between static trackees and dynamic (moving) trackees.

When identifying static trackee location information, three distinct pieces of information may be available. This information may include a global location, floor number, and altitude as detailed in Table 2. These known values could be entered into the Neon Command Station software and may be associated with Waypoints, NFC Check-in locations, and Multi-sensor Anchor Nodes or estimated (which may be referred to herein as soft waypoints/check-ins or dropped anchors to differentiate them from those with known location) by the NEON navigation engine. Only static trackees that have at least one piece of position information may be considered. As dynamic trackees traverse the world, they may check-in at waypoints and NFC check-in locations, and collect ranging data between themselves and other static and dynamic trackees.

TABLE 2

Static Trackee Position Information

| Static Trackee Position Information | Details |
|---|---|
| Global Location | Latitude and Longitude |
| Known Floor Number | Floor number |
| Known Altitude | Altitude in meters above sea level |

Once all known static trackees have been determined, the Create Elevation Ranges cortex may extract distance constraints between each of the static trackees and other dynamic trackees. These constraints can be created in response to measured sensor data or user actions (for example, Table 3).

TABLE 3

Elevation Engine Ranging Constrains

| Constraint Type | Value | Location Information |
|---|---|---|
| Chirp Spread-Spectrum Ranging | distance with error | Relative distance between trackees |
| Waypoint Check-in | 0 meter distance | Absolute location |
| User Correction | 0 meter distance | Absolute location to floor or altitude |

In this embodiment, 0 meter distance constraints can be used for waypoints check-ins and user corrections, but these could be other fixed values or even variable values potentially entered by the user (e.g., the trackee).

Elevation Global Solver Cortex

The Elevation Global Solver can perform a global optimization over given constraints to solve for trackee elevation. The main function of the solver may be to determine the computation of global offsets for each trackee. However, to do this, the global solver may first solve for a pressure reference that is needed in order to remove local atmospheric pressure variation.

Since a barometric pressure sensor can be used as an input, it may be necessary to remove local atmospheric pressure variation; this variation is present both inside and outside of buildings. Additionally, each device can have a significant offset relative to other devices. While barometric pressure sensors often have a precise resolution and thus precise relative accuracy when looking at the data from a single sensor, they can suffer from a poor absolute accuracy and can show significant sensor to sensor variation. In practice this sensor to sensor offset can resolve to an elevation error of multiple floors between two trackees if offsets are not properly resolved. The datasheet information for the pressure sensor used in the TRX Tracking Unit (or any dynamic trackee device) is listed below in Table 4.

TABLE 4

TRX Tracking Unit Barometric Pressure Sensor Datasheet Information

| Parameter | Value (mbar) | Value (Pa) | Distance (m, sea level) |
|---|---|---|---|
| Resolution | 0.012 | 1.2 | 0.09989 |
| Accuracy | ±1.5 | ±150 | ±12.494 |

In order to correct for local atmospheric pressure variation, a stationary pressure reference algorithm can be used to fuse the pressure data from all static trackees into a single 0-based stationary pressure reference, as further described herein below. Data can be collected from multiple static trackees as various data rates. An assumption can be made that all static trackees will experience the same local atmospheric pressure variation, which has been observed to be a sufficiently good approximation in practice when tracking over a relatively small area (e.g., an area corresponding to a few traveled miles).

Given constraints to static trackees with known elevations, constraints between dynamic trackees, and stationary pressure reference corrections to trackee pressure data, an iterative solver can be used to determine the offsets per dynamic trackee that satisfies the most constraints possible. An assumption is made that constraints can be satisfied by applying a single offset to the corrected pressure for each trackee.

Stationary Pressure Reference

Figure 2:
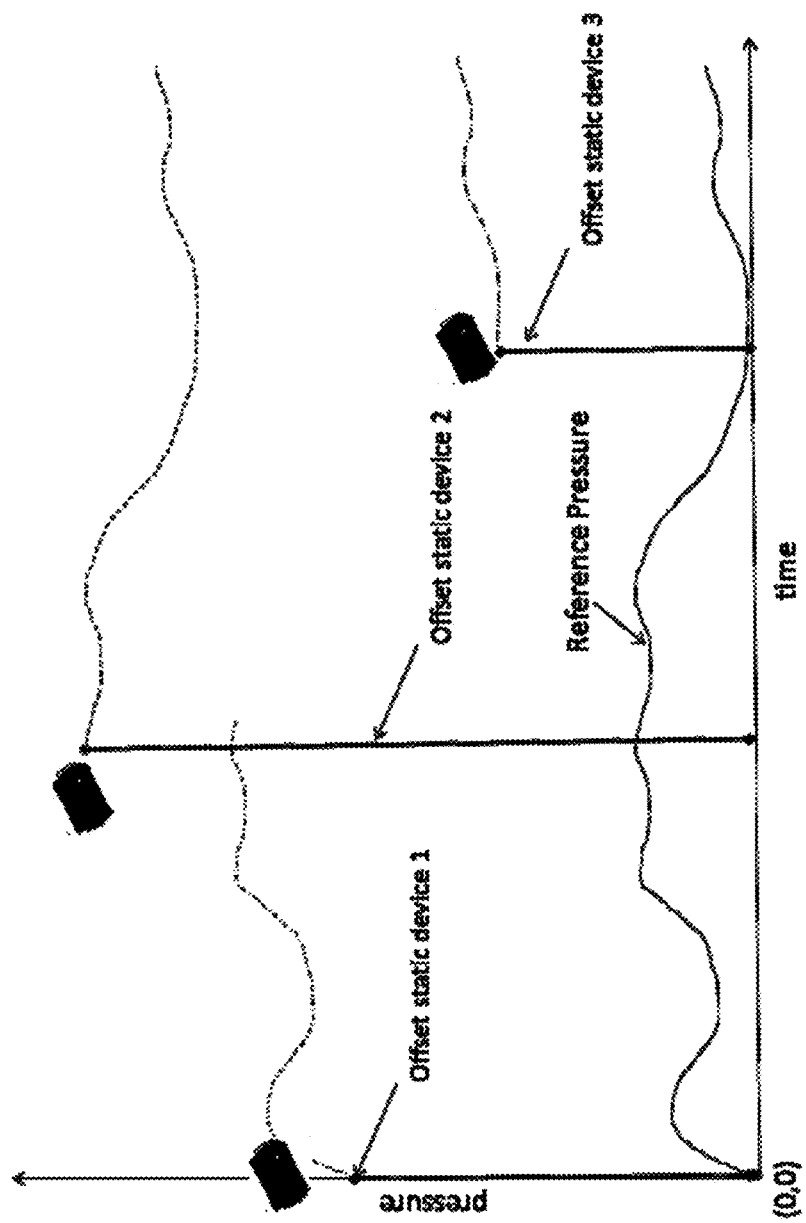
FIG. 2 illustrates an example for creating stationary pressure reference, according to an embodiment of the present disclosure.

The stationary pressure reference is a measure of the local atmospheric variation of pressure. It can be used to compensate for pressure variation that is not due to a change in elevation. The stationary pressure reference is created using data combined from static trackees in a local area. FIG. 2 shows pictorially the concept of combining pressure data from sensors with potentially unknown elevation to derive a measure of pressure variation.

To create the stationary pressure reference, time correlated pressure data may be required from static trackees. This data can then be stored in bins separated by 2 seconds (or another similar time interval). As each new static trackee pressure is added to the stationary pressure reference data structure, the offset for that static trackee can be determined. The computed offset can be a combination of the device offset and any fixed elevation offset resulting from the location of the device.

The first static trackee data received can be given an offset equal to their measured pressure and thus the first pressure reference value can be 0 (this is a 0-based data structure, although other data structures may be use and other references may be used for this data structure or other data structures. Offsets for all subsequent static trackee's can be calculated relative to the stationary pressure reference. The stationary pressure reference structure can adjust for the offset for each static trackee before adding samples to the reference pressure structure.

When static trackee pressure data with an unknown offset is deposited, its offset can be resolved using the following rules:
1. If there is no stationary pressure reference data
   Offset=0
2. If the input time is less than the first stationary pressure reference time (assume that the pressure was constant prior to that time)
   Offset=first stationary pressure reference pressure−static trackee pressure data
3. If the input time is greater than the last stationary pressure reference time (assume that the pressure was constant after that time)
   Offset=last stationary pressure reference pressure−static trackee pressure data
4. Otherwise
   Offset=last stationary pressure reference pressure with time less than input time−static trackee pressure data.

Once the offset has been determined, the offset adjusted pressure reference data (Offset−static trackee pressure data) can be stored into the 2-second bins (or any other bins corresponding to the used time interval). Each 2-second bin may keep track of all pressure values deposited into the bin. There may be one or many pressure values within each bin. Since pressure reference data may be from trackees that are not moving, if there are any periods of missing data, the pressure data over those periods can be assumed constant. In the end, each bin can be averaged to create a unified stationary pressure reference signal. This takes advantage of all static trackee pressure values and can produce a more consistent estimate of the atmospheric pressure drift by averaging over all static trackees.

When the elevation global solver needs to reference the stationary pressure reference, a method can be used to query the stationary pressure reference data at a particular point in time. This method can return a pressure value at a particular time using the following rules:
1. If there is no pressure reference data
   pressure reference=0
2. If the input time is less than the first stationary pressure reference time
   pressure reference=first stationary pressure reference pressure
3. If the input time is greater than the last stationary pressure reference time
   pressure reference=last stationary pressure reference pressure
4. Otherwise
   pressure reference=linearly interpolated stationary reference pressure between closest points by time.

Adjusted Pressure

Once the stationary pressure reference has been determined, each dynamic trackee's pressure can be adjusted to account for atmospheric drift. The corrected pressure, p(t), can be calculated by subtracting the stationary reference pressure from the dynamic trackee's pressure. The compensated signal can then be filtered using a window filter to remove any noise. This could be any smoothing filter. Since pressure data may not be uniformly sampled, the number of future and past data samples may not be guaranteed to be equal. To better handle the non-uniformity of the data, in an embodiment, the windowed filter can be implemented such that it may equally weight prior data, current data, and future data in the smoothing filter irrelevant of the number of available data points. As an example, a window around the current data point of 10 seconds, ±5 seconds, is used. The filtered pressure, f(t), can be given by:

$$f(t) = \frac{p(t)*(1+l(t)*r(t)) + \left(\sum_{p(i) \in L_t}(p(i)*r(t))\right) + \left(\sum_{p(i) \in R_t}(p(i)*l(t))\right)}{1 + 3*l(t)r(t)}$$

$p(t) = \{\text{input pressure}\}$ $L_t = \{\text{pressure values between } t-5 \text{ and } t\}$ $R_t = \{\text{pressure values between } t \text{ and } t+5\}$ $l(t) = \{\text{number of values between } t-5 \text{ and } t\}$ $r(t) = \{\text{number of values between } t \text{ and } t+5\}.$ Generate Constraints Once a filtered dynamic trackee pressure signal is available for each dynamic trackee, elevation constrains can be created to be used in the elevation global solver. Each constraint type may contain a cost function and a gradient of the cost function. The constraints can be solved by iteratively minimizing the cost function. The solver may attempt to lower the cost of each constraint to 0. The gradients can be used to determine how to shift the pressure in the z direction to minimize the total cost. Overall, the global solver can be responsible for determining the z offset for each dynamic trackee.

The first type of constraint is an altitude elevation constraint; this is a constraint between a dynamic trackee elevation and a static trackee elevation. This constraint can be created when a dynamic trackee gets a range measurement to a static trackee. In addition to the range measurement, the static trackee may have knowledge of either its floor number or its geo-referenced elevation (e.g. height above the earth reference ellipsoid WGS-84). When geo-referenced elevation is not available, the user entered building model can be used to calculate the elevation based on the local terrain elevation information and building information including floor number. Local terrain elevation data is available from U.S. Geological Survey (USGS) in the United States. If local terrain data is not available, the ground level immediately outside of a building can be assumed to be 0 elevation. Away from the building the elevation will track relative elevation based on data available from pressure. In this case, there may not be enough information to automatically handle multilevel entrances or multiple buildings in non-flat terrain. The cost and gradient functions for the altitude elevation constraint can be given by:

$$\text{cost} = \begin{cases} (e+r)^2 & e < -r \\ (e-r)^2 & e > r \\ 0 & \text{otherwise} \end{cases}$$

$$\text{gradient} = \begin{cases} -1 & e < -r \\ 1 & e > r \\ 0 & \text{otherwise} \end{cases}$$

$e = p + o - a$ $r = \{\text{range constraint}\}$ $a = \{\text{static trackee altitude}\}$ $p = \{\text{dynamic trackee presssure}\}$ $o = \{\text{calculated offset}\}.$ The second type of constraint is a trackee to trackee elevation constraint. This constraint is created between the elevations of two dynamic trackees. The benefit of this constraint can be that as more dynamic trackees are created, they can help each other better resolve their global offset by using the ranging data shared between them. These constraints should have lower weight than the static constraints so the cost can be multiplied by a weight such that the sum of all trackee to trackee constraints is equal to 0.1*number of static constraints (or a similar weight). The cost and gradient functions for the trackee to trackee elevation constraint can be given by:

$$\text{cost} = \begin{cases} w*(e+r_{kj})^2 & e < -r_{kj} \\ w*(e-r_{kj})^2 & e > r_{kj} \\ 0 & \text{otherwise} \end{cases}$$

$$\text{gradient} = \begin{cases} -w & e < -r_{kj} \\ w & e > r_{kj} \\ 0 & \text{otherwise} \end{cases}$$

$e = (p_k + o_k) - (p_j + o_j)$ $w = 0.1 * \frac{n_s}{n_{p2p}} \{\text{person to person constraints weight}\}$ $n_s = \{\text{the number of static constraints}\}$ $n_{p2p} = \{\text{the number of person to person constraints}\}$ $r_{kj} = \{\text{range between dynamic trackee } k \text{ and } j\}$ $p_k = \{\text{pressure of dynamic trackee } k\}$ $o_k = \{\text{calculated offset of dynamic trackee } k\}.$ Solve Constrains The elevation global solver can be configured as a robust iterative constraint solver. It may first loop through all constraints by trackee, attempting to find the best offset for each trackee. Once an offset has been computed for each trackee, if the sum of the costs is lower than the best known cost, then the offset can be changed to the new value. This type of iterative constraint solvers can typically be iterated until they reach a maximum number of iterations or the cost decrease per step is below a threshold.

A more detailed description of the algorithm is provided below in pseudo code as an example:

```
for (i = 0; i < iterations; i++)
{
    for (j = 0; j < numTrackees; j++)
    {
        gradient = sum of gradients for trackee j;
        offset = (gradient > 0) ? previousOffset - step : previousOffset + step;
        cost = sum of all costs for trackee j;
        if (cost < lastCost)
            step *= 1.2;
        if (cost > lastCost)
            step *= 0.8;
        lastCosts[j] = cost;
        lastOffsets[j] = offset;
    }
    lastCosts = sum of costs of all trackees for last iteration;
    bestCosts = sum of costs of all trackees for lowest cost iteration;
```

-continued

```
    if (lastCosts < bestCosts)
    {
        bestCosts = lastCosts;
        bestOffsets = lastOffsets;
    }
}
```

Once the offset for each dynamic trackee has been determined, the resolved elevations can be forwarded to the elevation local solver to handle smaller local changes.

Elevation Local Solver Cortex

The elevation local solver can resolve the final elevation of a dynamic trackee. The Indoor path points for dynamic trackees can be broken into stable segments and unstable segments. Constraints to static trackees and other dynamic trackees can be used again. Buildings can be included in the solver, where floor heights can be adaptively adjusted in order to solve constraint conditions. Terrain data can be included for outdoor path points. A single iterative particle solver can be used to resolve the final elevation per dynamic trackee and the final adjusted floor heights of buildings. A particle solver is a standard mechanism in physics and computer graphics of repeatedly iterating through a series of constraints until a solution that "best" satisfies the constraints is reached Building Model Each building that contains any part of any trackee's locations can be included in the particle solver. A building has floors with set heights above the ground level. Each floor has a known absolute elevation. A simple model is used in FIG. 3 as an example. However, the same algorithm could apply to a variety of building models that may include more complex models.

Figure 3:
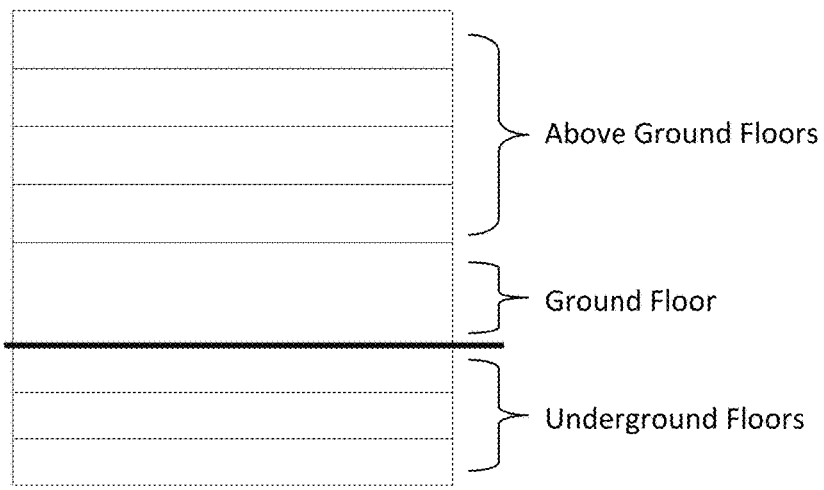
FIG. 3 illustrates an example of a standard building model, according to an embodiment of the present disclosure.

The default building model can assume that every basement level has the same floor height as other basement levels, the ground level has its own unique height, and the levels higher than the ground level all have the same floor height as other above ground levels. FIG. 3 shows the standard building model, with levels assumed to have the same heights in the same color.

The particle solver can adjust the height of each floor when satisfying constraints. The building model can have its own solve mechanism. All floors that are modified by the solver can be used to calculate the below ground floor height, ground floor height, and above ground floor height. If the ground floor is modified, the value can simply be kept. If any floors below ground are modified, the average floor height can be estimated and then applied to all floors below ground. If any above ground floors are modified and the ground floor itself is already set, a simple average can be estimated and applied to the above ground floors. If the ground floor has not been modified, a linear regression can be used such that the offset component of the linear regression is the ground floor height, and the slope is the above ground floor height.

Path Segmentation

The input path for each dynamic trackee can be segmented and the endpoints of the segments can be set as nodes for the particle solver. An example mechanism that the particle solver uses to act on each node type is described in the next section.

The segmentation of the path can proceed as follows: the input elevation can be parsed in order of ascending time. All points that are indoors and considered stable can be grouped into a single segment. Below is the formula for determining if a point may be considered stable. The method checks for elevation changes on the left and right of the current point and if either side is flat, the point may be considered to be stable.

$$stable(t) = leftStable(t) \text{ OR } rightStable(t)$$

$$leftStable(t) = $$
$$\max\left(\max_{p(i) \in L_t}(p(i)), \tilde{p}(t-8)\right) - \min\left(\min_{p(i) \in L_t}(p(i)), \tilde{p}(t-8)\right) < 0.5 \text{ m}$$

$$rightStable(t) = $$
$$\max\left(\max_{p(i) \in R_t}(p(i)), \tilde{p}(t-8)\right) - \min\left(\min_{p(i) \in R_t}(p(i)), \tilde{p}(t-8)\right) < 0.5 \text{ m}$$

$$p(t) = \{\text{input elevation}\}$$
$$\tilde{p}(t) = \{\text{linearly interpolated input elevation}\}$$
$$L_t = \{\text{elevation values between } t-8 \text{ s and } t\}$$
$$R_t = \{\text{elevation values between } t \text{ and } t+8 \text{ s}\}$$

Figure 4:
FIG. 4 illustrates an example plot for an input elevation in meters versus time with marked segments, according to an embodiment of the present disclosure.

Once the input elevation is segmented in to stable indoor segments, outdoor segments can be added every 10 seconds while outdoors, and underground segments are added every 10 seconds while not outdoors and not in a building. Other similar time intervals may also be used. FIG. 4 shows sample input elevation with path segments shown as black flat lines. The units are in meters versus time, and the segments are stored as a start and end time with an average elevation as shown on the plot.

Inertial Aiding

Pressure anomalies that are not caused by change in elevation on entry or exit from buildings can be observed in certain situations such as when the tracking system is used with firefighters near a fire. If high sample rate vertical accelerometer information is available to the system, the inertial data can be used to aid in filtering out pressure anomalies.

The z-axis accelerometer measures vertical acceleration. When there is a true elevation change, there are variations in the vertical acceleration and velocity. The vertical velocity can be computed by:
1. transforming the accelerometer data into the earth frame (tilt compensation);
2. filtering the (z-axis) accelerometer data with a band pass filter to remove constant effect of gravity and high frequency noise; and
3. integrating the tilt compensated and filtered (z-axis) accelerometer data.

If vertical velocity breaks a threshold, then a "vertical counter" can be incremented to indicate that a vertical change has occurred.

Using this aiding information, the path constraints between path segments (of all types) can be modified to eliminate pressure variation that may not be related to elevation change. If there is no change in the vertical counter over a segment, the constraint can be changed to indicate 0 elevation difference over the segment instead of using the elevation change based on pressure.

To demonstrate this method, an example test path is described herein below and is run through the algorithm in detail.

Test Path

Starting at $4^{th}$ floor SE exit, walk to end of hall and then upstairs at normal speed to $5^{th}$ floor.

Walk across 5$^{th}$ floor to stairwell and return to 4$^{th}$ at normal speed.
Walk across 4$^{th}$ to stairwell and go up at fast speed to 5$^{th}$.
Walk across 5$^{th}$ floor to stairwell and return to 4$^{th}$ at fast speed.
Walk across 4$^{th}$ to stairwell and go up at slow (one step at a time) speed to 5$^{th}$.
Walk across 5$^{th}$ floor to stairwell and return to 4$^{th}$ at slow speed.
Walk to 4$^{th}$ floor elevator and go down to 1$^{st}$.
Walk around lobby and then take elevator back to 4$^{th}$.

Algorithm

Figure 5:
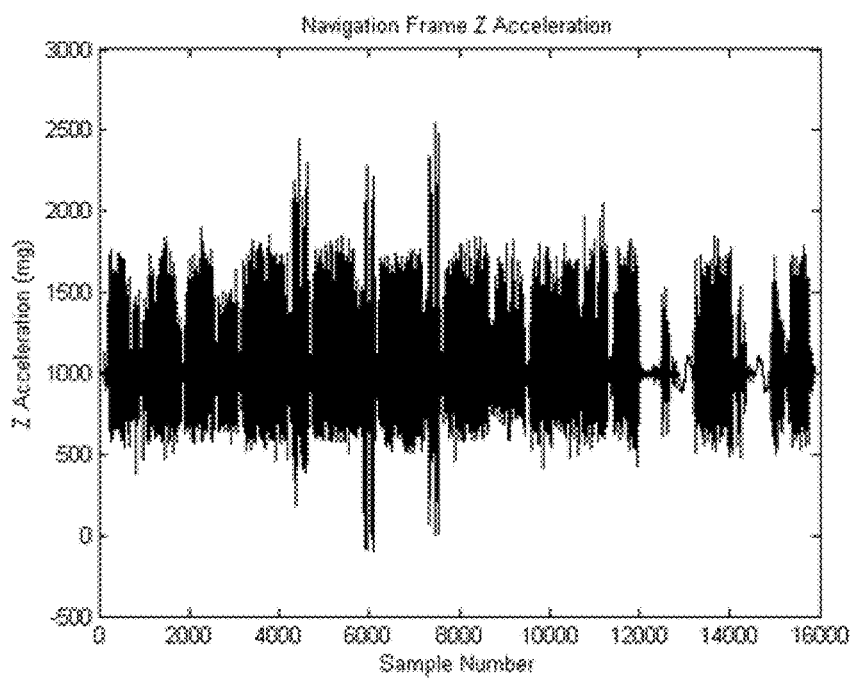
FIG. 5 illustrates an example navigation frame-z acceleration data, according to an embodiment of the present disclosure.
Figure 6:
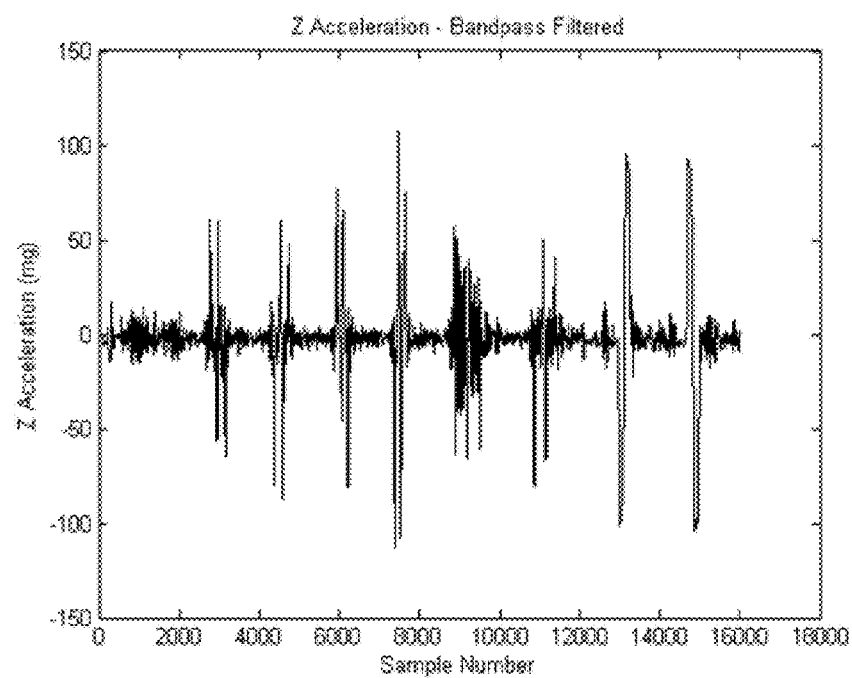
FIG. 6 illustrates an example navigation frame-z acceleration after bandpass filter, according to an embodiment of the present disclosure.
Figure 7:
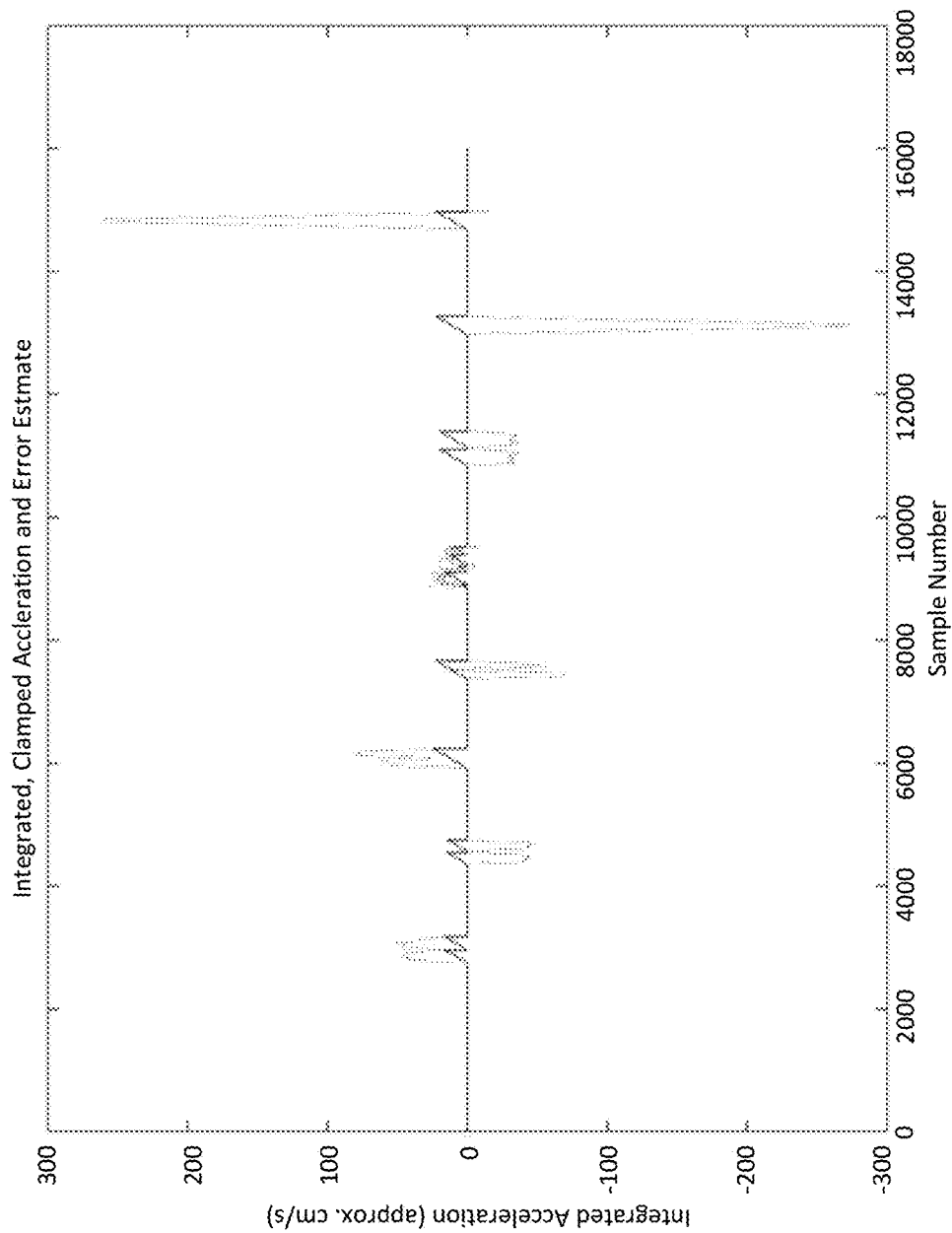
FIG. 7 illustrates an example Z Speed and estimated error, according to an embodiment of the present disclosure.
Figure 8:
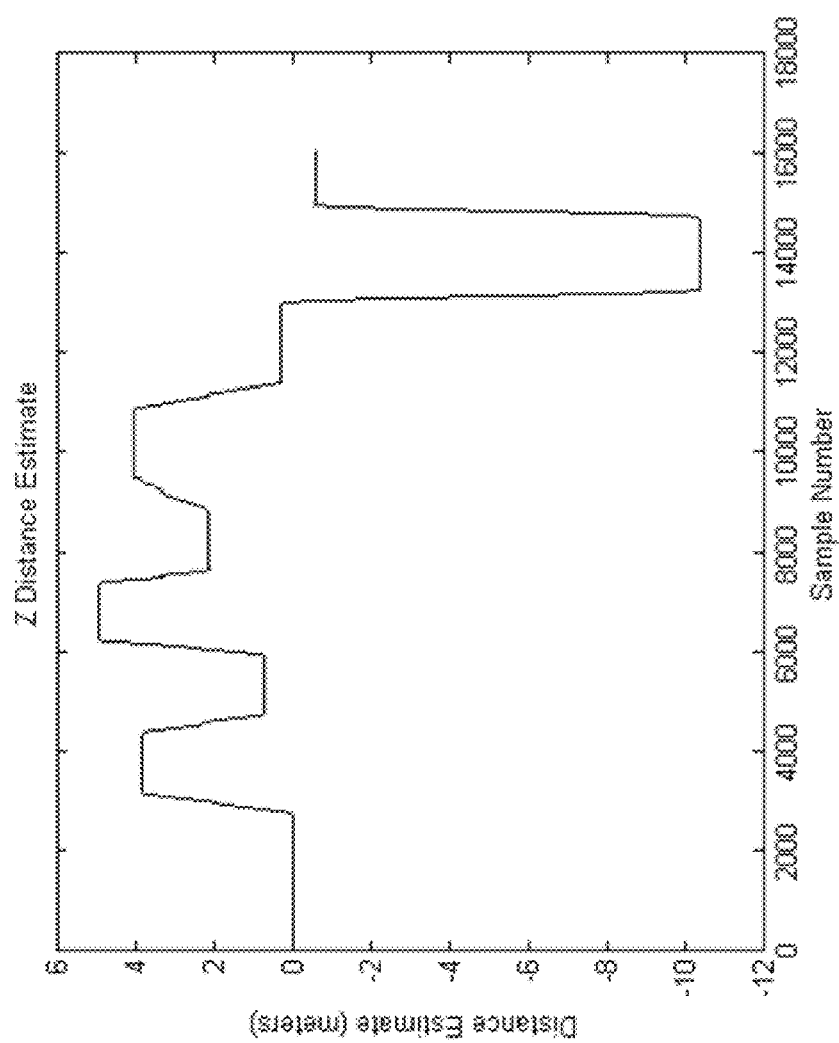
FIG. 8 illustrates an example vertical distance estimation, according to an embodiment of the present disclosure.

Sample Z acceleration data in navigation frame (an example is shown in FIG. 5) can be processed using the following algorithm:

1. Subtract 1000 mg gravitation acceleration from Z-acceleration sample.
2. Pass result of (1) through band pass filter (CUTOFF_LOWER=0.01, CUTOFF_UPPER=0.25). An example output of this step is shown in FIG. 6.
3. For each sample, if the absolute value of the sample is greater than threshold level ACTIVATION_THRESH_MG, enable integration of filtered acceleration signal and error signal which represents the maximum integration error due to poor calibration and noise (fixed to 3 mg per sample in this case). In short, the vertical speed is being clamped to zero for all times when the acceleration is near zero.
4. Once the acceleration integration result falls below the error integrator value, stop the integration. The result represents the vertical speed of the user. An example output of this step is shown in FIG. 7; the Z Speed is shown using a dotted line and the estimated error using a solid line. See "Benefits of 2 Integrators" below for more information.
5. Integrate result to compute distance. An example output of this step is shown in FIG. 8.

Accelerometer Offset Detection

It is very important that the accelerometer be calibrated well for this algorithm to work correctly. An offset detection algorithm can be used to refine Z-acceleration offset over time. This algorithm can involve the following listed steps.

1.) When the integrators are not active, filtered acceleration samples are accumulated. A counter is incremented for each sample accumulated.
2.) When the integrator becomes active, the sample counter is checked to ensure at least 10 seconds (or other time interval) of data has been accumulated.
3.) If enough data has been collected the z offset parameter is updated to be the average of all samples accumulated.

Benefit of 2 Integrators

If one integrator is used and stops integration too early, a secondary integrator that has continued integrating can help to prevent overshooting of integration as it returns to zero and provide better distance estimates (especially after, for example, a stair landing). In this embodiment, Integrator1 and Integrator2 start at zero and are enabled when the filtered acceleration value crosses a threshold. Integrator1 (e.g., the first integrator) can be stopped when the result falls within the integrator error estimate; Integrator2 (e.g., the second integrator) can continue to integrate until it is reset by a later elevation event.

Figure 9:
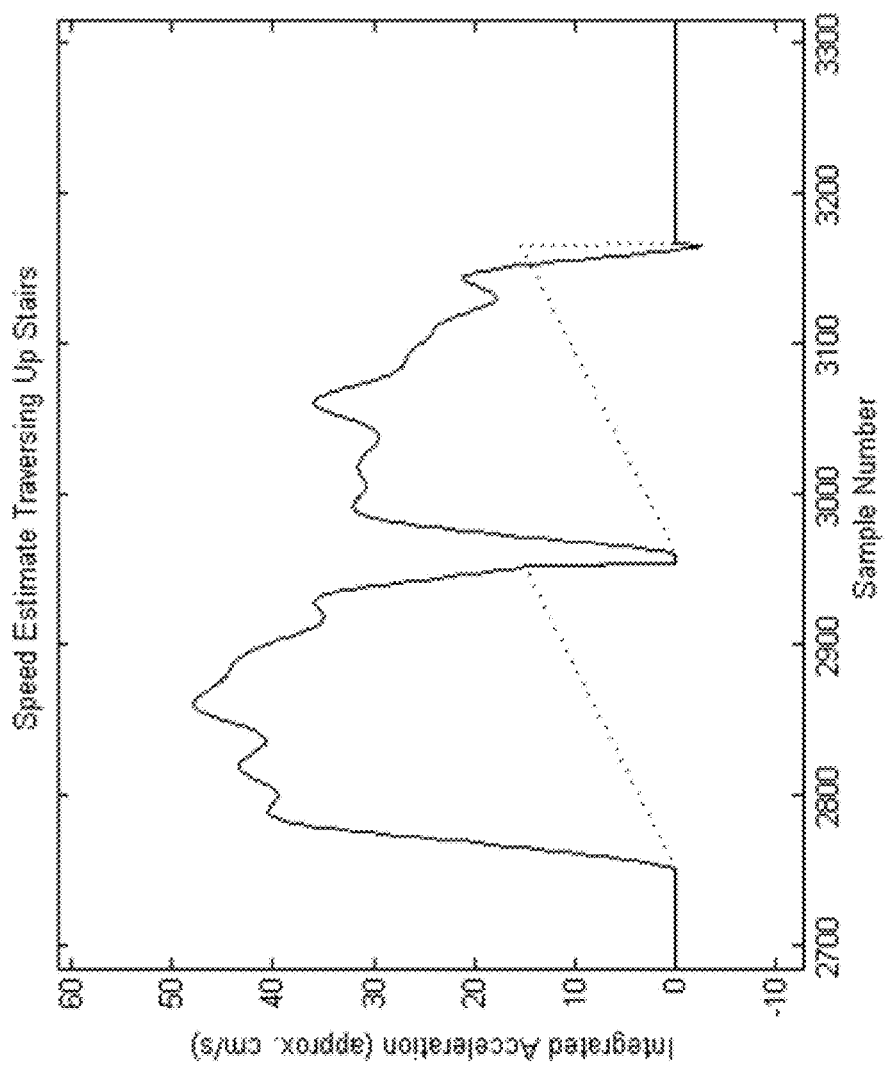
FIG. 9 illustrates an example vertical speed estimation using a single integrator, according to an embodiment of the present disclosure.
Figure 10:
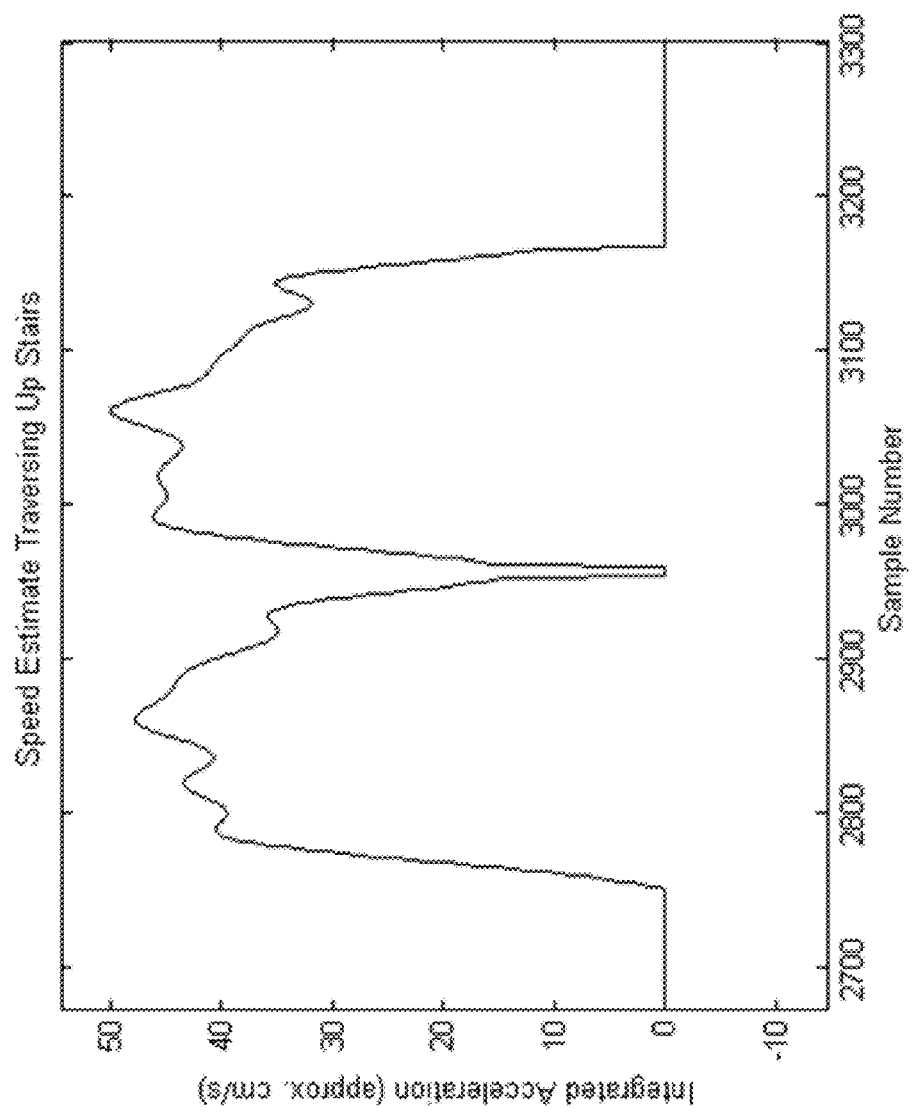
FIG. 10 illustrates an example vertical speed estimation using two integrators, according to an embodiment of the present disclosure.

If a second elevation event is detected shortly after (within about 2 seconds or a similar time interval) the end of a previous elevation event, the first integrator can be initialized at the value of the secondary integrator instead of being initialized to zero. The improvement gained is shown in FIG. 10 in comparison to FIG. 9 (compare the integrated acceleration data between samples 3100 and 3200). In FIG. 9, the estimated error is shown using a dotted line. In both FIGS. 9 and 10, the Z speed is shown using a solid line. As is shown in FIG. 10, the Z speed has a reduced overshoot as a result of using two integrators.

Selecting Band Pass Filter Cutoffs

The algorithm is not very sensitive to the lower cutoff threshold. In fact a simple low-pass filter may still work fairly well. The high cutoff and the threshold used for integrator activation work together to determine the types of elevation changes that may be detected.

Example of Integrated Signal with Mean Value Removed

Figure 11:
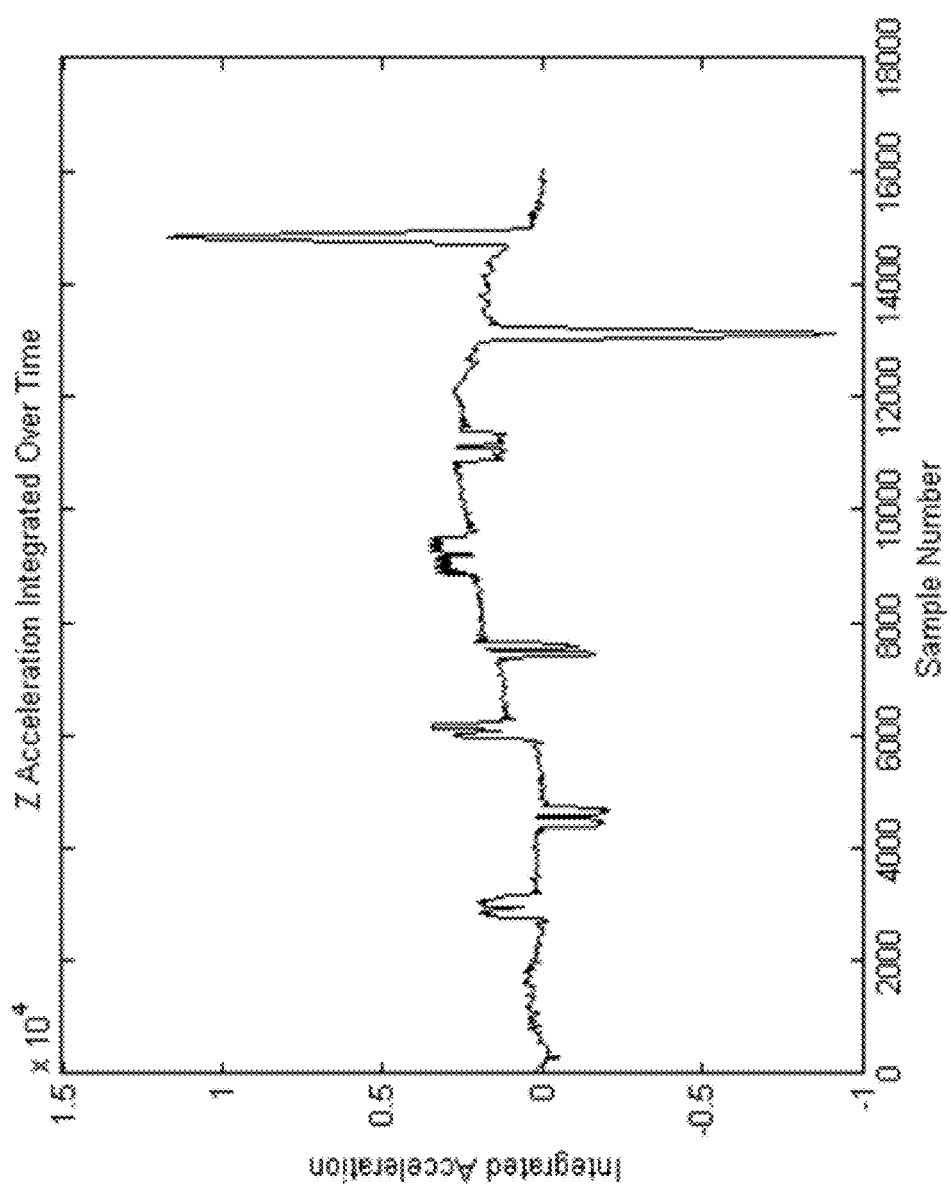
FIG. 11 illustrates an example inertial elevation aiding signal over time, according to an embodiment of the present disclosure.

Referring to FIG. 11, that figure illustrates the inertial elevation aiding signal (e.g., Z acceleration) over time. As shown in this figure, even with post-processing, completely removing the large low frequency component may be difficult.

MATLAB Code for Inertial Elevation Aiding Estimate

```
% Constants
ACTIVATION_THRESH_MG    =(25);
ZV2_RESET_TIME          =(2);
INTEGRATION_TIMEOUT     =(10);
ACCEL_ERROR_MG          =(3);
INPUT_SAMPLE_PERIOD     =(0.025);
% Filter cutoff
CUTOFF_LOWER            =(0.01);
CUTOFF_UPPER            =(0.25);
FILT_SAMPLE_RATE        =(40);
% Remove Acceleration due to gravity
zz = az − 1000;
% Bandpass filter input signal
zz = [zeros(1,63) zz'];
zz = zz';
b = fir1(63, [CUTOFF_LOWER/FILT_SAMPLE_RATE
CUTOFF_UPPER/FILT_SAMPLE_RATE], 'bandpass',
blackman(63+1));
zfilt = conv(b, zz);
% Workspace variables
enableIntegration = 0;
v1 = 0;         % Z integrator 1
v2 = 0;         % Z integrator 2
lastEndSample = 0;
lastStartSample = 0;
zerror = 0;
offset = 0;     % Estimate of z acceleration offset (i.e. calibration)
zsum = 0;
zcount = 0;
distance = 0;
% Start main loop
for i = 1:length(zfilt)
  s = zfilt(i) − offset;
  if(enableIntegration == 1)
    if ((abs(v1) < zerror) && (abs(s) < ACTIVATION_THRESH_MG))
      enableIntegration = 0;
      v1 = 0;
      zerror = 0;
      lastEndSample = i;
    else
      v1 = v1 + s*INPUT_SAMPLE_PERIOD; %Integrator 1 Update
      v2 = v2 + s*INPUT_SAMPLE_PERIOD; %Integrator 2 Update
      zerror = zerror + ACCEL_ERROR_MG *
INPUT_SAMPLE_PERIOD;%Error Integrator
    end
    % Stop integrating after 2 seconds
    if (((i-lastStartSample) >
INTEGRATION_TIMEOUT*FILT_SAMPLE_RATE) &&
(abs(s) < ACTIVATION_THRESH_MG))
      enableIntegration = 0;
      v1 = 0;
      v2 = 0;
      zerror = 0;
      lastEndSample = 0; % Errored out.. so invalidate
```

MATLAB Code for Inertial Elevation Aiding Estimate

```
    end
  elseif(enableIntegration == 0)
    if(abs(s) > ACTIVATION_THRESH_MG) %Condition that enables
    integrator
      enableIntegration = 1;
      lastStartSample = i;
      %If 400 samples have been collected, average to estimate sensor
      offset
      if(zcount > 400)
        offset = zsum / zcount;
      end
      % If this activation is within 2 sec of last then pick up
      % integration from z2. Otherwise restart bot integrators.
      if (i-lastEndSample) < (ZV2_RESET_TIME *
      FILT_SAMPLE_RATE)
        v1 = v2+s*INPUT_SAMPLE_PERIOD;
      else
        v1 = s*INPUT_SAMPLE_PERIOD;
        v2 = v1;
      end
      % Reset averaging logic
      zcount = 0;
      zsum = 0;
    else
      % This is the idle (not integrating case)
      % Ignore beginning 200 samples and accumulate the rest
      if(i>200)
        zsum = zsum + zfilt(i);
        zcount = zcount + 1;
      end
    end
  end
  distance = distance+v1*INPUT_SAMPLE_PERIOD;
end
```

Generate Constraints and Nodes

The iterative particle solver uses nodes and constraints. Certain nodes have special properties such as:

path indoor and stable nodes attempt to snap to a floor in a building;

path outdoor nodes try to snap to the outdoor terrain; and fixed floor nodes may directly affect building floor locations.

All constraints may enforce a minimum and maximum allowed difference in elevation. For example, a received range of 3 meters from a fixed anchor at elevation z would enforce elevation min of z−3 and max of z+3. The difference in elevation can be positive or negative depending on direction. Each dynamic node can have a cost, snap, and solve mechanism that is utilized in the particle solver. Each constraint can have a cost and solve mechanism.

Fixed Altitude Node

This node is used for constraints to static trackees that are at a known altitude. This node has no cost, no solve mechanism, and no snapping. It cannot be moved and is a fixed point. It is used as an anchor in the solver.

Fixed Floor Node

This node is used for constraints to static trackees that are on a known floor. It is attached to a Floor from the building model. The cost of this node may be set as the square distance in meters away from the attached floor. The snapping mechanism may set the elevation of this node equal to the elevation of the attached floor from the building model. The solve mechanism may move the node 50% (or another similar percentage) toward the attached floor, and move the attached floor 50% (or a similar percentage complimentary to the other percentage such that the sum of both percentages is near or equal 100%) toward the node.

Path Indoor and Stable Node

This node is used for stable indoor path segments. It has no known floor, but is assumed to be attached to a floor in the building model. The cost of this node may be set as the square distance in meters away from the closest current floor in the building model. The snap mechanism may set the elevation of this node equal to the nearest floor if the node is within 35% of the floor height in the building model. The solve mechanism may pull the nearest floor 50% (or another similar percentage) toward the node. If the node was within 35% of the floor height in the building model, the node is moved 50% toward the floor (or a similar percentage complimentary to the other percentage such that the sum of both percentages is near or equal 100%).

Path Outdoor Node

Outdoor path nodes are for path points of dynamic trackees that are not in buildings and not underground. The node references the terrain data to determine surface elevation. The cost, snap, and solve mechanism of this node may depend on whether the node is within 2 m of the terrain. If the node is not within 2 m, there may be no cost, snap, or solve functionality; the elevation is not affected by the solver. This, for example, enables a trackee to walk across a bridge without being snapped to the ground. If it is within 2 m, the cost may be set as the square distance away from the terrain. The snap mechanism may set the node elevation equal to the terrain. The solve mechanism may set the node elevation to the terrain.

Path Underground Node

An assumption is made that there is no known underground map, otherwise a building structure would be added and the underground node would be treated as a basement level of a building. Without a map, a Path Underground Node may be affected by constraints, but may have no other cost, snap, or solve mechanism. Unlike a Fixed Altitude node, this node can be moved by constraints.

Path Constraint

This constraint can only be created between two path nodes. Path nodes occur in order over time and can be indoor, outdoor, or underground. The difference in elevation between these nodes, as indicated from the input data from the previous cortex, is the constraint difference. The relative elevation of the nodes should remain the same as the original input. The cost may be set as the difference between the actual distance and desired distance of the nodes squared. If the actual distance falls within the allowed range, there may be no cost. The solve mechanism may push or pull each node 50% (or another similar percentage) toward the desired distance. If one of the nodes is locked, the unlocked node may be moved 100% of the way.

Range Constraint

This constraint occurs between a path node and a fixed node and is created from the input constraints. If the direction of the difference in elevation between nodes is not provided, the absolute value of the difference must be constrained to be less than a certain range. The cost of this constraint may be set as the difference between the maximum range and the actual elevation difference squared. If the actual elevation difference is less than the maximum range then there may be no cost. The solve mechanism may pull each node 50% (or a similar percentage) toward each other to satisfy being within the maximum range. If one node is locked, the other moves 100% of the way to satisfy the maximum allowed distance.

Trackee to Trackee Constraint

This constraint occurs between path nodes from different people. It is created from the input constraints. The direction of the difference in elevation may not be provided, only the absolute values may be given. The cost and solve mechanism may be identical to range constraints.

Solve Constraints

The particle solver may contain nodes and constraints between nodes. The previous section described the cost estimating, solving and snapping mechanism. The solver may include a combination of these nodes and constraints. The solve algorithm can be set as follows:

```
function Solve( )
{
    for 1..10
    {
        for 1..100
        {
            foreach Constraint in SolveConstraints
            {
                Constraint.Solve( )
            }
            foreach Node in SolverNodes
            {
                Node.Solve( )
            }
        }
        foreach Building in SolverBuildings
        {
            Building.SolveFloorHeights( )
        }
        cost = 0
        foreach Constraint in SolverConstraints
        {
            cost += Constraint.Cost( )
        }
        foreach Node in SolverNodes
        {
            cost += Node.Cost( )
        }
        if cost < 0.1
        {
            exit
        }
    }
    foreach Node in SolverNodes
    {
        Node.Snap( )
    }
}
```

The particle solver may iterate through each constraint and node, fully resolving the constraints by locally moving the path. By iterating through all the nodes and constraints, the system may settle to a reasonable answer. A dampening factor can be applied to all the node and constraint solve mechanisms to reduce potential oscillations. The final step of the solver can include a step to snap each node to a building level or outdoor terrain if applicable. The nodes represent a sampled version of the full path elevation, so after each node has been given a final elevation, the full path input elevation can be fitted to the nodes. The input signal can be either set to a constant value in the case of indoor path nodes, or scaled and translated for all other nodes. The final result can be a set of elevation points over time that agrees with the final nodes from the particle solver.

Figure 12:
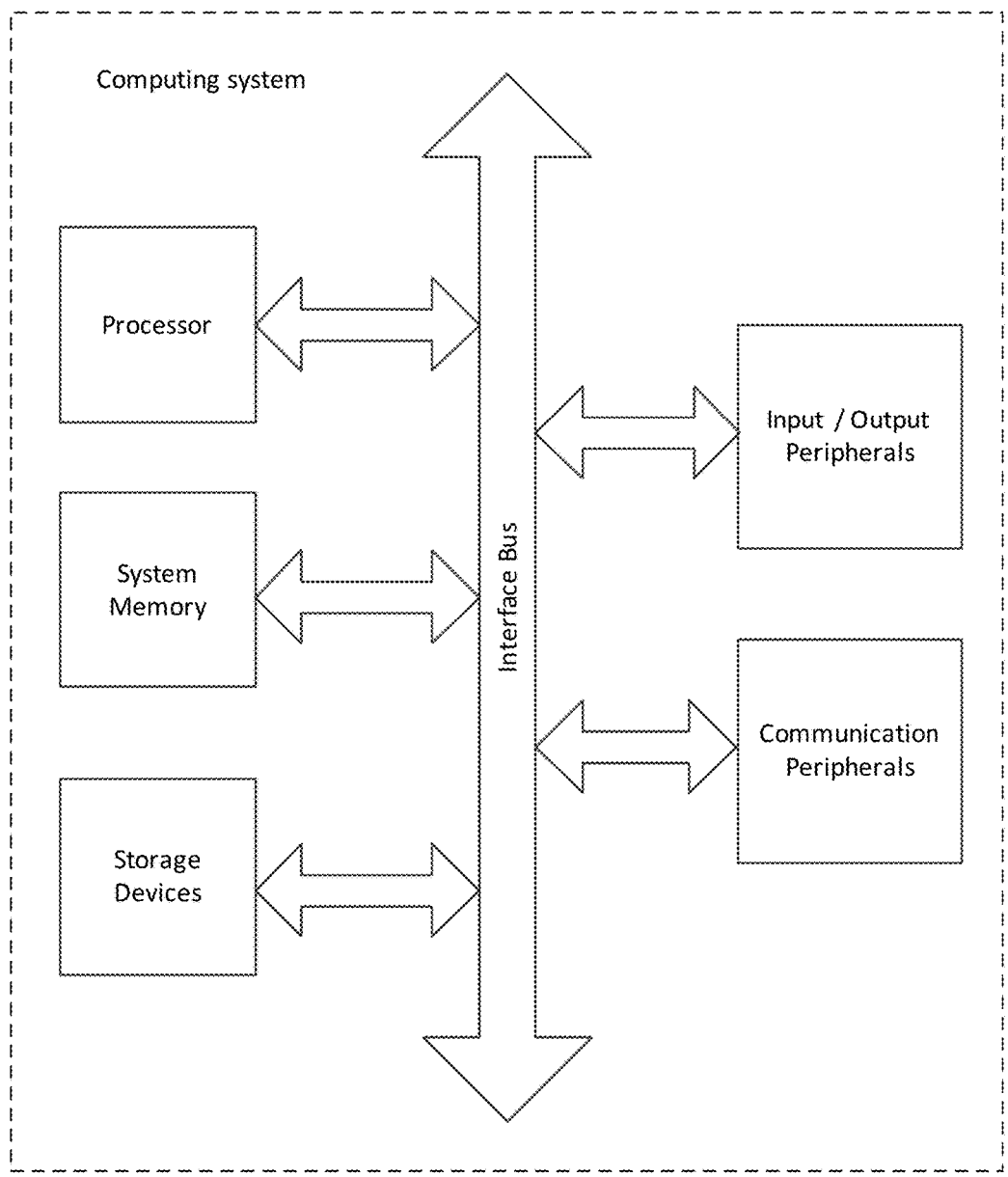
FIG. 12 illustrates an example computing system, according to an embodiment of the present disclosure.

The techniques described above can be implemented on a computing device associated with a user, a plurality of computing devices associated with a plurality of users, a server in communication with the computing device(s), or a plurality of servers in communication with the computing device(s). Additionally, the techniques may be distributed between the computing device(s) and the server(s). For example, the computing device may collect and transmit raw data to the server that, in turn, process the raw data to generate an elevation. FIG. 12 describes a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system. This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A method for updating a building elevation model, comprising:
    obtaining sensor data, including location data and inertial sensor data, from a tracked computing device among a plurality of tracked computing devices;
    using the sensor data to generate a path of the tracked device;
    using the sensor data to estimate elevation of the tracked device;
    segmenting the path;
    generating a node at an endpoint of each path segment;
    classifying each node based on the node's location and the estimated elevation;
    generating one or more elevation constraints for each node, wherein the elevation constraints are based on the node's classification;
    resolving the elevation constraints to refine each node's location and estimated elevation; and
    updating the building elevation model, including one or more floor heights, using each node's refined location and estimated elevation.

2. The method of claim 1, wherein the sensor data further includes pressure data, and further comprising applying inertial aiding to remove pressure fluctuations from the pressure data.

3. The method of claim 2, wherein applying inertial aiding comprises:
    transforming the inertial sensor data to compensate for tilt;
    filtering the inertial sensor data;
    integrating the tilt-compensated data and filtered data to calculate vertical velocity;
    determining an elevation change using the vertical velocity; and
    updating the pressure data based on the elevation change.

4. The method of claim 2, further comprising:
    determining a stationary pressure reference to remove local pressure variation from the pressure data.

5. The method of claim 1, further comprising:
    obtaining local terrain elevation data along the path to determine a local terrain elevation;
    determining an elevation offset between the local terrain elevation and the estimated elevation; and
    updating the estimated elevation with the elevation offset.

6. The method of claim 1, wherein segmenting the path further comprises:
    parsing the path into points, based on ascending time;
    determining whether a point on the path is stable relative to a consecutive point on the path using a function of the estimated elevation; and
    grouping consecutive stable points into a path segment.

7. The method of claim 1, wherein classifying each node comprises:
   determining whether each node is located indoors, outdoors, or underground.

8. The method of claim 7, further comprising:
   associating indoor nodes with a floor in the building elevation model.

9. The method of claim 1, wherein an elevation constraint enforces a minimum and a maximum allowed adjustment to each node's estimated elevation.

10. The method of claim 1, wherein resolving the elevation constraints further comprises:
    iterating through each of the elevation constraints for each node along a path segment to determine node elevations and floor heights for each node that satisfy corresponding elevation constraint.

11. The method of claim 1, further comprising:
    updating the building elevation model using the sensor data obtained from each tracked computing device among the plurality of tracked computing devices.

12. The method of claim 1, wherein the sensor data does not include pressure data.

13. The method of claim 1, wherein segmenting the path is based on one or more of time, the estimated elevation, and the location data.

14. A computing system for updating a building elevation model, the computing system comprising:
    a processor;
    a memory communicatively coupled to the processor, the memory bearing instructions that, when executed on the processor, cause the computing system to at least:
        obtain sensor data, including location data and inertial sensor data, from a tracked computing device among a plurality of tracked computing devices;
        use the sensor data to generate a path of the tracked device;
        use the sensor data to estimate elevation of the tracked device;
        segment the path;
        generate a node at an endpoint of each path segment;
        classify each node based on the node's location and the estimated elevation;
        generate one or more elevation constraints for each node, wherein the elevation constraints are based on the node's classification;
        resolve the elevation constraints to refine each node's location and estimated elevation; and
        update the building elevation model, including one or more floor heights, using each node's refined location and estimated elevation.

15. The system of claim 14, wherein the sensor data includes pressure data, and wherein the instructions, when executed on the processor, further cause the computing system to apply inertial aiding to remove pressure fluctuations from the pressure data.

16. The system of claim 15, wherein the instructions that apply inertial aiding comprise instructions, when executed on the processor, that cause the computing system to:
    transform the inertial sensor data to compensate for tilt;
    filter the inertial sensor data;
    integrate the tilt-compensated data and filtered data to calculate vertical velocity;
    determine an elevation change using the vertical velocity; and
    update the pressure data based on the elevation change.

17. The system of claim 15, wherein the instructions, when executed on the processor, further cause the computing system to at least:
    determine a stationary pressure reference to remove local pressure variation from the pressure data.

18. The system of claim 14, wherein the instructions, when executed on the processor, further cause the computing system to at least:
    obtain local terrain elevation data along the path to determine a local terrain elevation;
    determine an elevation offset between the local terrain elevation and the estimated elevation; and
    update the estimated elevation with the elevation offset.

19. The system of claim 14, wherein the instructions to segment the path, when executed on the processor, further cause the computing system to at least:
    parse the path into points, based on ascending time;
    determine whether a point on the path is stable relative to a consecutive point on the path using a function of the estimated elevation; and
    group consecutive stable points into a path segment.

20. The system of claim 14, wherein the instructions to classify each node, when executed on the processor, further cause the computing system to at least:
    determine whether each node is located indoors, outdoors, or underground.

21. The system of claim 20, wherein the instructions, when executed on the processor, further cause the computing system to:
    associate indoor nodes with a floor in the building elevation model.

22. The system of claim 14, wherein an elevation constraint enforces a minimum and a maximum allowed adjustment to the node's estimated elevation.

23. The system of claim 14, wherein the instructions to resolve the elevation constraints, when executed on the processor, further cause the computing system to at least:
    iterate through the elevation constraints for each node along a path segment to determine node elevations and floor heights for each node that satisfy the corresponding elevation constraint; and
    adjust node elevation and/or one or more floor heights in the building model.

24. The system of claim 14, wherein the instructions, when executed on the processor, further cause the computing system to at least:
    update the building elevation model using the sensor data obtained from each tracked computing device among the plurality of tracked computing devices.

25. The system of claim 14, wherein the sensor data does not include pressure data.

26. The method of claim 14, wherein segmenting the path is based on one or more of time, the estimated elevation, and the location data.

27. A non-transitory computer readable storage medium comprising instructions that, when executed on a computing system configured to update a building elevation model, cause the computing system to at least:
    obtain sensor data, including location data and inertial sensor data, from a tracked computing device among a plurality of tracked computing devices;
    use the sensor data to generate a path of the tracked device;
    use the sensor data to estimate elevation of the tracked device;
    segment the path;
    generate a node at an endpoint of each path segment;

classify each node based on the node's location and the estimated elevation;

generate one or more elevation constraints for each node, wherein the elevation constraints are based on the node's classification;

resolve the elevation constraints to refine each node's location and estimated elevation; and update the building elevation model, including one or more floor heights, using each node's refined location and estimated elevation.

28. The non-transitory computer readable storage medium of claim 27, wherein the sensor data includes pressure data, and wherein the instructions, when executed on the computing system, cause the computing system to apply inertial aiding to remove pressure fluctuations from the pressure data.

29. The non-transitory computer readable storage medium of claim 28, wherein the instructions that apply inertial aiding comprise instructions, when executing on the computing system, cause the computing system to at least:

transform the inertial sensor data to compensate for tilt;

filter the inertial sensor data;

integrate the tilt-compensated data and filtered data to calculate vertical velocity;

determine an elevation change using the vertical velocity; and update the pressure data.

30. The non-transitory computer readable storage medium of claim 28, wherein the instructions further cause the computing system to at least:

determine a stationary pressure reference to remove local pressure variation from the pressure data.

31. The non-transitory computer readable storage medium of claim 27, wherein the instructions further cause the computing system to at least:

obtain local terrain elevation data along the path to determine a local terrain elevation;

determine an elevation offset between the local terrain elevation and the estimated elevation; and update the estimated elevation with the elevation offset.

32. The non-transitory computer readable storage medium of claim 27, wherein the instructions to segment the path further cause the computing system to at least:

parse the path into points, based on ascending time;

determine whether a point on the path is stable relative to a consecutive point on the path, using a function of the estimated elevation; and group consecutive stable points into a path segment.

33. The non-transitory computer readable storage medium of claim 27, wherein the instructions to classify each node further cause the computing system to at least:

determine whether each node is located indoors, outdoors, or underground.

34. The non-transitory computer readable storage medium of claim 33, wherein the instructions, when executed on the computing system, further cause the computing system to:

associate indoor nodes with a floor in the building elevation model.

35. The non-transitory computer readable storage medium of claim 27, wherein an elevation constraint enforces a minimum and maximum allowed adjustment to the node's estimated elevation.

36. The non-transitory computer readable storage medium of claim 27, wherein the instructions to resolve the elevation constraints further cause the computing system to at least:

iterate through the elevation constraints for each node along a path segment to determine node elevations and floor heights for each node that satisfy the corresponding elevation constraint; and adjust node elevation and/or one or more floor heights in the building model.

37. The non-transitory computer readable storage medium of claim 27, wherein the instructions further cause the computing system to at least:

update the building elevation model using the sensor data obtained from each tracked computing device among the plurality of tracked computing devices.

38. The non-transitory computer readable storage medium of claim 27, wherein the sensor data does not include pressure data.

39. The non-transitory computer storage medium of claim 27, wherein segmenting the path is based on one or more of time, the estimated elevation, and the location data.

* * * * *